United States Patent [19]
Langmuir

[11] Patent Number: 6,036,497
[45] Date of Patent: Mar. 14, 2000

[54] DYNAMIC MODEL OF THE DNA MOLECULE

[76] Inventor: David B. Langmuir, 350 21st St., Santa Monica, Calif. 90402

[21] Appl. No.: 09/320,432

[22] Filed: May 26, 1999

Related U.S. Application Data

[60] Provisional application No. 60/094,146, Jul. 25, 1998.

[51] Int. Cl.[7] .................................................. G09B 23/26
[52] U.S. Cl. ............................................................ 434/279
[58] Field of Search ............................ 434/279; 446/105, 446/106, 107, 108, 112

[56] References Cited

U.S. PATENT DOCUMENTS

| | | | |
|---|---|---|---|
| 3,296,714 | 1/1967 | Klotz | 434/279 |
| 3,445,940 | 5/1969 | Dziulak | 434/279 |
| 3,594,924 | 7/1971 | Baker | 434/279 |
| 3,802,097 | 4/1974 | Gluck | 434/279 |
| 3,903,616 | 9/1975 | Gage | 434/279 |
| 4,184,271 | 1/1980 | Barnett | 434/279 |
| 4,507,089 | 3/1985 | Tchuempe-Tchuente | 434/279 |

FOREIGN PATENT DOCUMENTS

| | | | |
|---|---|---|---|
| 1277731 | 6/1972 | United Kingdom | 434/279 |

*Primary Examiner*—Robert A. Hafer
*Assistant Examiner*—Kurt Fernstrom
*Attorney, Agent, or Firm*—Trojan Law Offices

[57] ABSTRACT

The invention is a dynamic model of the DNA molecule. The invention includes a multiplicity of physical representations of the four nucleotides. Each physical representation is comprised of T-shaped members having an elongate body attached to a flexible planar member. The invention also includes a first joint, located at an end of the elongate bodies which physically represent the Adenine base and the Thymine base, for attaching the Adenine base to the Thymine base, wherein the joint is rotatable. The invention further includes a second joint, located at an end of the elongate bodies which physically represent the Guanine base and the Cytosine base, for attaching the Guanine base to the Cytosine base, wherein the joint is rotatable. Lastly, the invention includes a connections between the nucleotides and the flexible planar member. The flexible planar member physically represents the sugar-phosphate structure of the DNA molecule. Preferably the elongate bodies are made-up of a rigid material, and the flexible planar members are made-up of vinyl. It is also preferred that the joints and connections are easily engaged and disengaged.

10 Claims, 5 Drawing Sheets

DYNAMIC MODEL OF THE DNA MOLECULE

CROSS-REFERENCE TO A RELATED APPLICATION

This application is based on a provisional application Ser. No. 60/094,146, filed Jul. 25, 1998.

FIELD OF THE INVENTION

This invention relates generally to dynamic models, and more specifically to dynamic models of the DNA (deoxyribonucleic acid) molecule.

BACKGROUND OF THE INVENTION

To fully understand the usefulness of the invention as a teaching tool, a brief review of the structure and function of DNA is required. DNA is the basic code for creating most living things on this planet. As a result of its power and usefulness, the importance of teaching and explaining the structure and function of DNA has become a high priority.

The structure of DNA was ascertained by Watson and Crick, and in 1953, a biology textbook was able to state, "[t]he age old question of how hereditary information is duplicated and passed on, duplicated and passed on, for generation after generation had in principle been answered." Watson and Crick were able to determine that the basic shape of the molecule was a double helix. This particular double helix has four nucleotide bases, namely, Adenine, Thymine, Cytosine, and Guanine. These four nucleotide bases are generally abbreviated A, T, C, and G.

The DNA molecule (FIG. 1) is made-up of two strands, aligned parallel to each other. The strands are formed by the bonding of the sugar (deoxyribose) component and the phosphate component of the DNA molecule. These strands make-up the double helix which usually coils clockwise. Perpendicular to the strands, and bonded to the sugar components, are the bases. The strands are joined together by the pairing of the bases, which bond together between the two helical strands. There are two classifications of bases, Purines and Pyrimidines. The Purine molecules are larger than the Pyrimidines molecules. Adenine and Guanine are Purines and Cytosine and Thymine are Pyrimidines.

The sequence of the nucleotide bases A, G, C, and T along the helical strand is all important because it conveys the hereditary information contained in the DNA molecule. This information depends on the order in which the base pairs are arranged along the helical strand. There are no limitations upon this order, the bases can be arranged in absolutely any sequence. There is, however, a stringent base-pairing rule: T can pair only with A, and C can pair only with G, more generally a Purine can only pair with a Pyrimidine. This is more clearly apparent when the difference in size of the Purine and Pyrimidine molecules are taken into account. In order to maintain the structure of the strands of the double helix, the strands must be substantially equidistant from each other. For this to occur the Purine must only bond to a Pyrimidine due to the difference in size between the molecules, hence the base pair rule. The DNA molecule thus consists of a chain of A-T and C-G base pairs which can be put together in any order up to hundreds of millions in a single chain.

The strands of the DNA molecule are made-up of two molecules, the sugar and the phosphate molecules. Each sugar has two different sites at which a phosphate molecule can bind, the 3' (three prime) site and the 5' (five prime) site. As a result each strand is formed by . . . -phosphate-sugar-phosphate-sugar- . . . bonds. It is important to note that each strand has directionality, meaning that one strand has an order of 5'-3'-5'-3'-5'-3' and as a result the opposing strand will have an order of 3'-5'-3'-5'-3'-5'.

When DNA duplicates itself it is called replication; replication occurs just prior to cellular division. In order for the DNA molecule to replicate, it must first unwind from the double helix into a form called the "ladder", and second, the A-T and C-G bonds must be broken and the molecule unzips to allow the two strands to separate. When the molecule is unzipped the bases on both strands are exposed to allow free-floating nucleotides to bond with them thereby creating a copy of both of the DNA strands.

Another important function of DNA is that it is the code for the making of proteins. The first step in making a protein is called transcription. Generally, transcription follows the same process as replication, however, the main difference is that DNA is copied into RNA instead of DNA. RNA has a very similar structure to DNA with a few differences, principally, RNA is single stranded and has four nucleotide bases with one significant difference. The four nucleotide bases that make-up RNA are Adenine, Cytosine, Guanine, and Uracil. Uracil takes the place of Thymine in DNA. RNA adheres to the following base pair rules: A binds only to U, and C binds only to G. Each combination of three bases code for a particular amino acid. Each combination of three bases is called a codon. There are many combinations of three bases which can be made (e.g., ATC, GCA, TCA). There are usually twenty amino acids used by mammals. Some codons code for the same amino acid. Amino acids are the building blocks for proteins, which serve a multitude of critical functions in living organisms. Because a particular codon codes for a particular amino acid, it is important in which direction the combination of three bases is read, for example, CAT does not code for the same amino acid as does TAC. Therefore, in order for DNA to function properly, the molecule must have some type of directional indicators. The model incorporates such directionality.

Currently, models of the DNA molecule are being used to teach and inform people about its structure. There is, however, at least one significant deficiency associated with these models, they are static. As a result of being static these models cannot teach people how DNA functions, this is left to drawings and discussion. How DNA functions is a very important concept and often difficult to understand, as such the art is amenable to useful refinement.

SUMMARY OF THE INVENTION

The present invention introduces such refinement. The invention is a dynamic model of deoxyribonucleic acid (DNA) that includes a multiplicity of physical representations of nucleotides. Each is comprised of an elongate body and a flexible planar member, the elongate body is attached to the flexible planar member substantially at a midpoint. The elongate body physically represents one of the four nucleotide bases Adenine, Thymine, Guanine, and Cytosine. The elongate body has a first end, a second end and a longitudinal axis. The flexible planar member has a first attachment site, a second attachment site and two opposite sides.

The invention also includes a first joint, located at the first end of the elongate bodies which physically represent the Adenine base and the Thymine base, wherein the Adenine base has a first means for rotatably engaging a second means of the Thymine base, thereby producing a base pair. The invention further includes a second joint, located at the first end of the elongate bodies which physically represent the Cytosine base and the Guanine base, wherein the Guanine base has a third means for rotatably engaging a fourth means of the Cytosine base, thereby producing a base pair. The invention lastly includes means, located at the first attachment site and the second attachment site and on interior and exterior surfaces of the flexible planar member respectively, for connecting the physical representations of the nucleotides together.

The foregoing may constitute a description or definition of the invention in its broadest or most general form. Even in this general form, however, it can be seen that this invention significantly mitigates the difficulties left unresolved in the art. In particular, this invention is a dynamic model of the DNA molecule and as such is capable of accurately representing the basic structure of DNA as well as accurately representing how DNA functions. Although this aspect of the invention in its broad form represents a significant advance in the art, it is preferably practiced in conjunction with certain other features or characteristics that further enhance enjoyment of the invention.

For example, it is preferred that the elongate body is comprised of a rigid material, and the flexible planar member is comprised of material such as vinyl, 4-ply bristol board, or other material of similar flexible characteristics. It is also preferred that the first joint comprises a peg and a hole for receiving the peg thereby producing a joint which easily rotates and is also easily engaged and disengaged. It is further preferred that the peg and hole for receiving the peg are circular and of substantially equal diameter.

Also preferred is that the second joint comprises a peg and a hole for receiving the peg thereby producing a joint which easily rotates and is also easily engaged and disengaged, and the peg and hold for receiving the peg are circular and of substantially equal diameter. The pegs and holes for Adenine and Thymine, and for Guanine and Cytosine must be of different sizes. As a result the Adenine base can only engage the Thymine base, and the Guanine base can only engage the Cytosine base. Further preferred is that the connecting means are comprised of two strips of hook-and-loop material disposed on the flexible planar member, thereby creating a connection which is strong but also easily engaged and disengaged.

All of the foregoing operational principles and advantages of the present invention will be more fully appreciate upon consideration of the following detailed description, with reference to the appended drawings.

DESCRIPTION OF THE PREFERRED EMBODIMENTS

While the invention will be described in connection with preferred embodiments, it will be understood that it is not intended to limit the invention to those embodiments. On the contrary, it is intended to cover all alternatives, modifications, and equivalents as may be included within the spirit and scope of the invention as defined by the appended claims.

Figure 1:
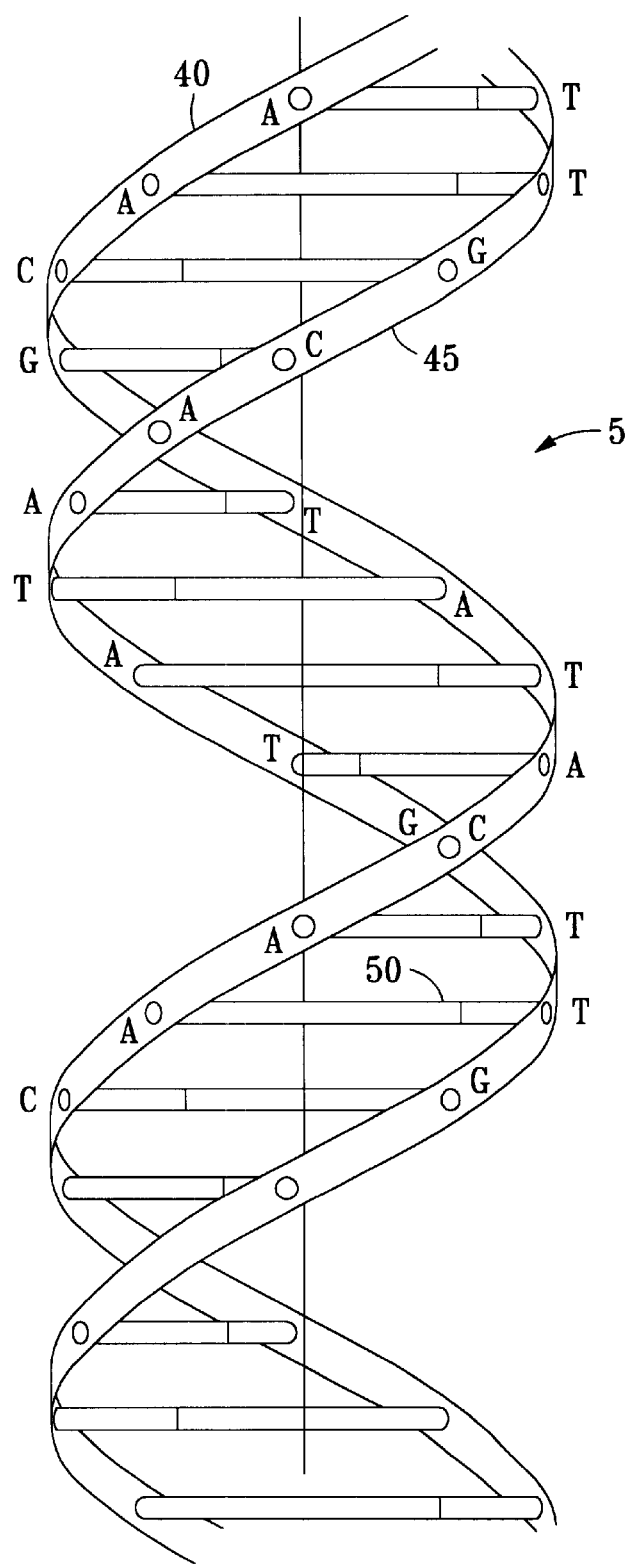
FIG. 1 is a diagram showing a short section of the DNA molecule in the helical form.

The DNA molecule's (FIG. 1) basic shape is that of a double helix 5. The double helix 5 is formed by two strands 40 and 45 and a multiplicity of rungs 50. The present invention is a model of the DNA molecule.

Nucleotides bond together to form the DNA molecule. The basic structure of a nucleotide is a base, a sugar (deoxyribose), and a phosphate. The sugar and phosphate portion of the nucleotide do not vary in structure. The base, however, can be one of four bases: Adenine, Thymine, Guanine, and Cytosine.

Figure 2:
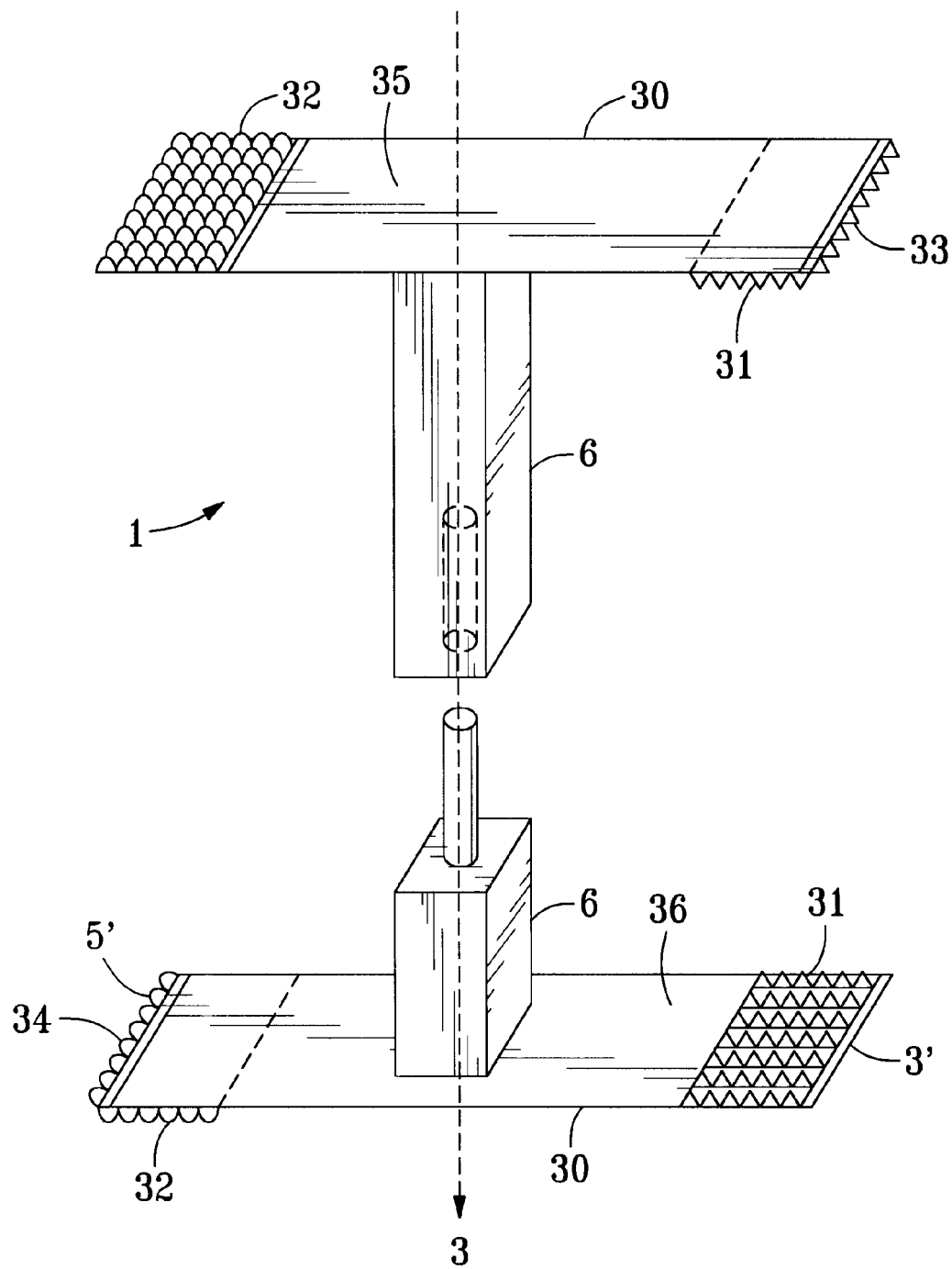
FIG. 2 is a diagram showing a pair of individual T-shaped members representing a nucleotide.

The basic nucleotide structure is physically represented in the invention by a T-shaped member 1. Each T-shaped member (FIG. 2) has an elongate body 6 and a flexible planar member 30. The elongate body can be attached at approximately the midpoint of the flexible planar member 30. The flexible planar member has a first attachment site 33, a second attachment site 34, an exterior surface 35 and an interior surface 36.

Located at the first attachment site on the interior surface 36 is a first attachment means 31. Located at the second attachment site 34 on the exterior surface 35 is a second attachment means 32 which is complementary to the first attachment means 31. As a result of the configuration of the attachment means 31 and 32, any T-shaped member can be connected to any other T-shaped member in any sequence. If the direction is correct. In the preferred embodiment, the attachment means 31 and 32 are comprised of a hook-and-loop material such as VELCRO®. But any attachment means that can be quickly engaged and disengaged will serve the desired purpose, another example of an attachment means is adhesive. The placement of the attachment sites 33, 34 on the exterior surface 35 and the interior surface 36, which are opposite surfaces to each other, illustrates the 3'–5' directionality of the DNA molecule. In this embodiment, the model can only be effectively assembled by placing the T-shaped members 1 (i.e., nucleotides) not only so that they match up in accordance with the base pairing rules, but also so that the 3'–5' directionality of the connections between nucleotides in the same single strand is respected.

Figure 3:
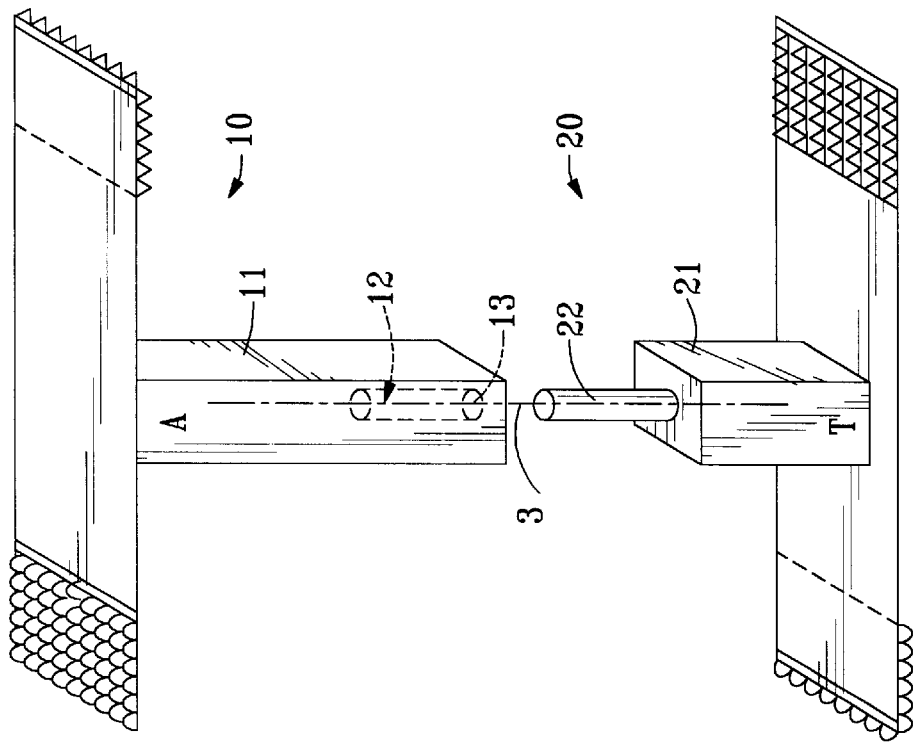
FIG. 3 is a diagram showing the physical representations of the four nucleotide bases which are the building blocks of the DNA molecule.
Figure 3:
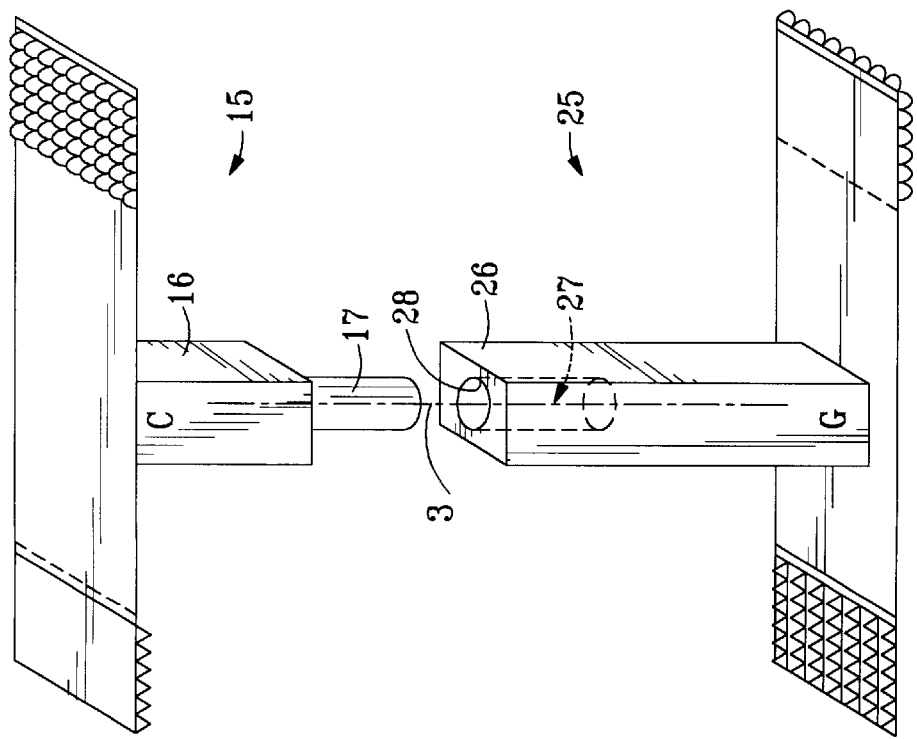

Each T-shaped member (FIGS. 3 and 5) is different depending on the nucleotide base it is representing, this is important because the model must follow the base pair rule that Adenine 10 only bonds with Thymine 20, and Cytosine 15 only bonds with Guanine 25. The physical representation of the Adenine base has an elongate body 11, the elongate body has a cylindrical hole 12, that runs parallel to the longitudinal axis 3 of the elongate body. The cylindrical hole terminates at the first end of the elongate body such that there is a circular opening 13.

The physical representation of the Thymine base 20 has an elongate body 21, which is shorter than the Adenine elongate body 11. The difference in size of the elongate bodies is to illustrate the difference in size between the Pyrimidine and the Purine. Located at the first end of the elongate body 21 is a circular peg 22, the circular peg has substantially the same diameter as the cylindrical hole 12 of the Adenine base. The circular peg 22 engages the cylindrical hole 12 of the Adenine elongate body 11, thereby creating a joint 14 (FIG. 5) that is rotatable about the longitudinal axis 3 of the elongate bodies 11 and 21. The physical representation of the Uracil base is essentially the same as the Thymine base 20, and the Uracil base only bonds to the Adenine base.

The physical representation of the Guanine base 25 is similar to the physical representation of the Adenine base 10. The Guanine base has an elongate body 26, the elongate body has a cylindrical hole 27, that runs parallel to the longitudinal axis 3 of the elongate body. The cylindrical hole terminates at the first end of the elongate body such that there is a circular opening 28. The important difference between the Guanine base and the Adenine base is the size of the cylindrical hole. The cylindrical hole 12 of the Adenine base is smaller than that of the cylindrical hole 27 of the Guanine base. This is essential to the proper functioning of the model because of the base pair rule. In order to teach people the structure of DNA, the model must follow this basic rule. Having the sizes of the cylindrical holes vary between the Adenine base and the Guanine base ensures this proper functioning.

The physical representation of the Cytosine base 15 has an elongate body 16, which is shorter than the Guanine elongate body 26, this is of pedagogical value in order to convey the difference in size of the Pyrimidine and the Purine. Located at the first end of the elongate body 16 is a circular peg 17, the circular peg has substantially the same diameter as the cylindrical hole 27 of the Guanine base. The circular peg 17 engages the cylindrical hole 27 of the Guanine elongate body 26, thereby creating a joint 18 that is rotatable about the longitudinal axis of the elongate bodies 16 and 26.

Figure 4:
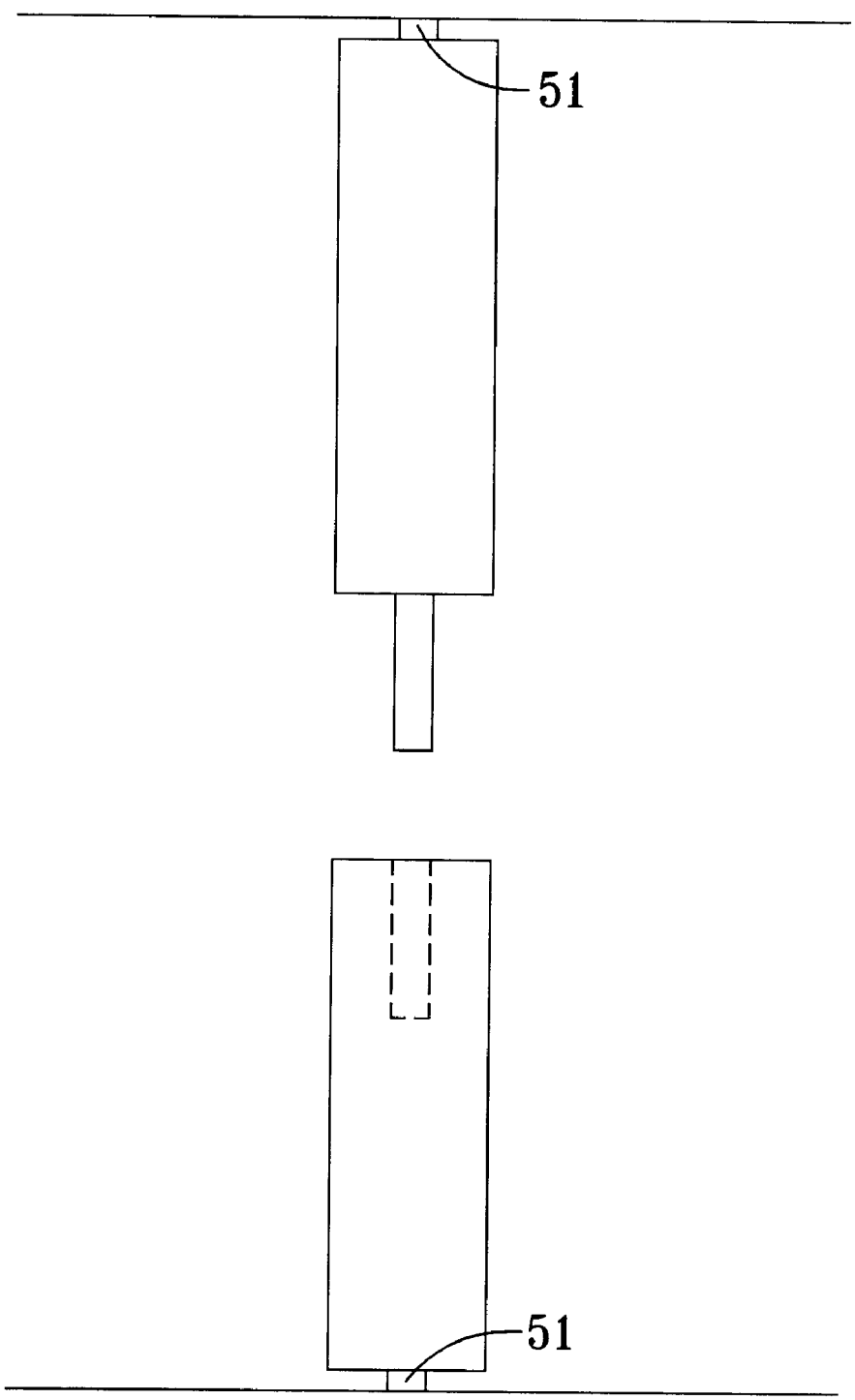
FIG. 4 is an isometric view of the second preferred embodiment of the invention showing the point of rotation at the attachment site of the elongate body and the flexible planar member.

In a second preferred embodiment (FIG. 4) the invention includes many of the same elements as the first preferred embodiment. In this second preferred embodiment, the elongate body is rotatably attached 50 to the flexible planar member. This attachment allows for rotation between the elongate body and the flexible planar member of the same T-shaped member. Having the point of rotation at this attachment allows the engaging means to be formed by any shaped peg and hole for receiving the peg such as square-shaped, star-shaped, oval-shaped, and/or heart-shaped, to name just some of the possible designs. The benefit of having the point of rotation at a site other than the engagement site is that the Adenine and Thymine bases can have a different shaped peg and hole for receiving the peg, then the Cytosine and Guanine peg and hole. This further demonstrates the basic base pair bonding rule of the DNA molecule, which states that the Adenine base only bonds to the Thymine base and the Cytosine base only bonds to the Guanine base.

As discussed above, the flexible planar member 30 (FIG. 5) can be connected 37 together in any order to form a strand 40. When the Adenine and Thymine bases are joined 14 and the Guanine and Cytosine bases are joined 18, then the complementary single strands 40 and 45 form a double strand that can be coiled into a double helix. The unique construction of the model permits the helix to form because the planar members and the attachment means are sufficiently flexible. This permits the strands 40 and 45 to be wound into a coil while rigid enough to maintain the structural integrity of the helix. The rotational capability of the circular pegs 17 and 22 permits the double strands to coil as a single unit to form the double helix.

Figure 5:
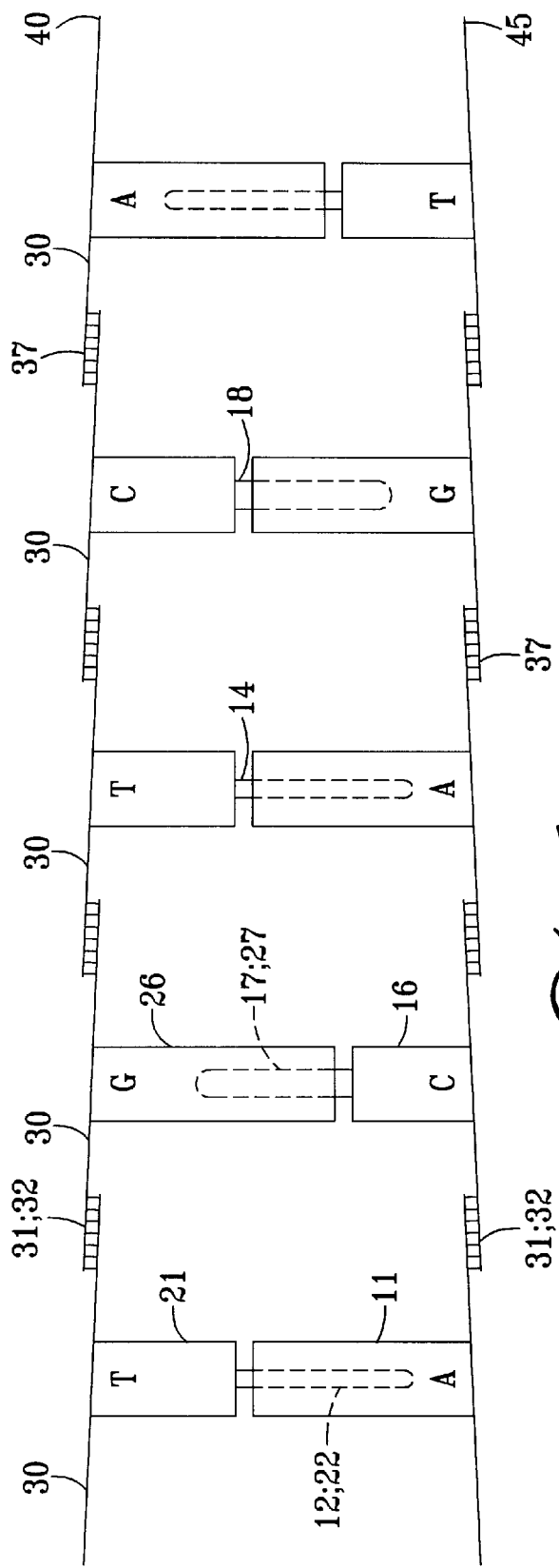
FIG. 5 is an isometric view of a short section of the first preferred embodiment of the invention, showing the the DNA molecule in its ladder form.

The DNA molecule has another shape called the "ladder" form (FIG. 5). The DNA molecule unwinds to a ladder shape during the first step of replication and transcription. As the model is unwound the joints 14 and 18 rotate about the longitudinal axis. Also the joints are easily disengaged to physically represent the second stage of replication and transcription where the DNA molecule unzips. Further, additional nucleotide bases can be used to demonstrate the last step in the replication process whereby the nucleotide bases in the surrounding medium, not a part of the DNA molecule itself bond to the now open sites of the nucleotide bases of the DNA molecule thereby replicating or transcribing the DNA molecule's sequence. This dynamic model allows people to see and learn first hand how the DNA molecule functions through all the stages of replication and transcription.

I claim:

1. A dynamic model of deoxyribonucleic acid (DNA) comprising:

a multiplicity of physical representations of nucleotides, each physical representation comprising an elongate body and a flexible planar member, the elongate body being a physical representation corresponding to one of the four nucleotide bases, Adenine, Thymine, Guanine, and Cytosine, the elongate body being attached to the flexible planar member substantially at a midpoint, the elongate body having a first end, a second end and a longitudinal axis, the flexible planar member having a first attachment site located in proximity to a first terminal edge, a second attachment site located in proximity to a second terminal edge, an interior surface and an exterior surface;

a first joint, located at the first end of the elongate bodies which physically represent the Adenine base and the Thymine base, wherein the Adenine base having a first means for rotatably engaging a second means of the Thymine base, thereby producing a base pair;

a second joint, located at the first end of the elongate bodies which physically represent the Guanine base and the Cytosine base, wherein the Guanine base having a third means for rotatably engaging a fourth means of the Cytosine base, thereby producing a base pair; and means, located at the first attachment site on the interior surface and at the second attachment site on the exterior surface of the flexible planar member, for connecting the physical representations of the nucleotides together.

2. The dynamic model of claim 1, wherein the elongate body is comprised of a rigid material.

3. The dynamic model of claim 1, wherein the flexible planar member is comprised of plastic.

4. The dynamic model of claim 1, wherein the first joint comprises a peg and a hole for receiving the peg thereby producing a joint which easily rotates and is also easily engaged and disengaged.

5. The dynamic model of claim 4, wherein the peg and hole for receiving the peg are circular and of such diameter to create a friction fit.

6. The dynamic model of claim 1, wherein the second joint comprises a peg and a hole for receiving the peg thereby producing a joint which easily rotates and is also easily engaged and disengaged.

7. The dynamic model of claim 6, wherein the peg and hole for receiving the peg are circular and of approximately equal diameter.

8. The dynamic model of claim 1, wherein the connecting means a comprise two strips of hook-and-loop material disposed on opposite sides of the flexible planar member, thereby creating a connection which is easily engaged and disengaged.

9. A dynamic model of deoxyribonucleic acid (DNA) comprising:

a multiplicity of T-shaped members each including an elongate body and a flexible planar member, the elongate body having a first end, a second end, and a longitudinal axis, the flexible planar member being attached perpendicularly to the longitudinal axis of the elongate body, the flexible planar member having two opposite sides;

means, fixed on the flexible planar member, for interconnecting each T-shaped member to another T-shaped member, the interconnecting means being disposed on the opposite sides and opposite ends of the flexible planar member, thereby illustrating the 3'–5' directional bonding of the sugar and the phosphate present in both DNA and RNA; and means, located at the first end of the elongate body of each T-shaped member, for engaging the first end of the elongate body of another T-shaped member.

10. A dynamic model of deoxyribonucleic acid (DNA) translation into ribonucleic acid (RNA) comprising:

a multiplicity of physical representations of nucleotides, each physical representation comprising an elongate body and a flexible planar member, the elongate body being a physical representation corresponding to one of the five nucleotide bases, Adenine, Thymine, Guanine, Cytosine and Uracil, the elongate body being attached to the flexible planar member, the elongate body having a first end, a second end and a longitudinal axis, the flexible planar member having a first attachment site located in proximity to a first terminal edge, a second attachment site located in proximity to a second terminal edge, said first attachment site being located on an interior surface of said flexible planar member and said second attachment site being located on said exterior surface of said flexible planar member, thereby accurately representing the 3'–5' directional bonding of the sugar and the phosphate present in both DNA and RNA;

a first joint, located at the first end of the elongate bodies which physically represent the Adenine base and the Thymine base, wherein the Adenine base having a first means for rotatably engaging a second means of the Thymine base, thereby producing a base pair;

a second joint, located at the first end of the elongate bodies physically representing the Guanine base and the Cytosine base, wherein the Guanine base having a third means for rotatably engaging fourth means of the Cytosine base, thereby producing a base pair;

a third Joint, located at the first end of the elongate bodies physically representing the Adenine base and the Uracil base, wherein the Adenine base having the first means for rotatable engaging a fifth means of the Uracil base, thereby producing a base pair; and means, located at the first attachment site and at the second attachment site of the flexible planar member, for connecting the physical representations of the nucleotides together.

* * * * *